United States Patent
Sharpe et al.

(10) Patent No.: US 11,498,084 B2
(45) Date of Patent: Nov. 15, 2022

(54) INERT GAS DISTRIBUTION

(71) Applicant: Airbus Operations Limited, Bristol (GB)

(72) Inventors: Paul Michael Sharpe, Bristol (GB); Stuart Quayle, Bristol (GB)

(73) Assignee: Airbus Operations Limited, Bristol (GB)

( * ) Notice: Subject to any disclaimer, the term of this patent is extended or adjusted under 35 U.S.C. 154(b) by 233 days.

(21) Appl. No.: 16/519,130

(22) Filed: Jul. 23, 2019

(65) Prior Publication Data

US 2020/0030824 A1 Jan. 30, 2020

(30) Foreign Application Priority Data

Jul. 30, 2018 (GB) .................................. 1812387

(51) Int. Cl.
| | |
|---|---|
| *B05B 1/34* | (2006.01) |
| *B05B 1/14* | (2006.01) |
| *B64D 37/32* | (2006.01) |
| *A62C 3/08* | (2006.01) |

(52) U.S. Cl.
CPC .................. *B05B 1/14* (2013.01); *A62C 3/08* (2013.01); *B05B 1/3402* (2018.08); *B64D 37/32* (2013.01)

(58) Field of Classification Search
CPC ..... B05B 1/005; B05B 1/3402; B05B 1/3073; B05B 1/06; B05B 1/26; B05B 1/14; A62C 31/02–24; A62C 3/08; A62C 31/05; B64D 37/32; F26B 21/004
See application file for complete search history.

(56) References Cited

U.S. PATENT DOCUMENTS

| | | | | |
|---|---|---|---|---|
| 2,706,527 | A * | 4/1955 | Guljas | A62C 3/065 169/57 |
| 3,784,101 | A * | 1/1974 | Frempter | B05B 17/08 239/17 |
| 5,197,548 | A * | 3/1993 | Volker | A62C 35/02 169/70 |
| 5,247,999 | A * | 9/1993 | Fowler | E21B 35/00 169/69 |
| 2007/0176028 | A1 | 8/2007 | Laidler et al. | |
| 2014/0110137 | A1* | 4/2014 | Ribarov | A62C 99/0018 169/44 |

FOREIGN PATENT DOCUMENTS

| | | |
|---|---|---|
| GB | 1 343 457 | 1/1974 |
| GB | 2 386 835 | 10/2003 |

OTHER PUBLICATIONS

"Spray Nozzle", Wikipedia contributors, Dec. 31, 2018, accessed Jan. 28, 2019, 11 pages, https://en.wikipedia.org/w/index.php?title=Spray_nozzle&oldid=876167389.
Combined Search and Examination Report for GB Application No. 1812387.7 dated Jan. 31, 2019, 7 pages.

* cited by examiner

*Primary Examiner* — Tuongminh N Pham
(74) *Attorney, Agent, or Firm* — Nixon & Vanderhye P.C.

(57) ABSTRACT

An inert gas distribution system nozzle 1 including an inlet 10 to receive fluid from a fluid supply, a chamber 32 to receive the fluid from the inlet and dimensioned relative to the inlet to permit the fluid to expand to form a mist, and at least one passage 34 to receive the fluid from the chamber and dimensioned relative to the chamber to promote condensing of the mist, wherein the, or each, passage comprises an outlet 40 to emit the fluid from the nozzle. A cross-sectional area of the passage is less than a cross-sectional area of the chamber.

18 Claims, 4 Drawing Sheets

INERT GAS DISTRIBUTION

CROSS RELATED APPLICATION

This application claims priority to United Kingdom (GB) patent application 1812387.7, filed Jul. 30, 2018, the entire contents of which is incorporated by reference.

TECHNICAL FIELD

The present invention relates to an inert gas distribution system, an inert gas distribution system nozzle, and a method of emitting fluid into a fuel tank using a nozzle of an inert gas distribution system.

BACKGROUND

An inert gas distribution system, also known as an inerting system, is a safety system used in some aircraft to release inert gas into the ullage of a fuel tank of the aircraft via one or more nozzles. The inert gas may, for example, be nitrogen, nitrogen-enriched-air, steam or carbon dioxide. The inert gas replaces or dilutes oxygen that may be present in the ullage, so as to reduce the oxygen concentration of the ullage to below a combustion threshold. This reduces the probability of combustion of fuel stored in the tank. The inert gas distribution system may, for example, be operational when the aircraft is in flight, when fuel is being withdrawn from the fuel tank to power the engine or engines of the aircraft and so the ullage is increasing in volume.

SUMMARY

A first aspect of the present invention provides an inert gas distribution system nozzle, the nozzle comprising: an inlet for receiving fluid, a flow path extending from the inlet, and an outlet for receiving the fluid from the flow path and expelling the fluid from the nozzle, wherein the flow path comprises a chamber and a passage, the chamber being located between the inlet and the passage, and wherein a cross-sectional area of the passage normal to the flow path is less than a cross-sectional area of the chamber normal to the flow path.

Optionally, the cross-sectional area of the passage is less than 10% of the cross-sectional area of the chamber.

Optionally, a length of the passage is at least 80% of a length of the chamber.

Optionally, the cross-sectional area of the passage is such as to promote laminar flow of the fluid.

Optionally, the cross-sectional area of the chamber is such as to permit the fluid to form a mist, and the cross-sectional area of the passage is such as to promote condensing of the mist.

Optionally, the nozzle comprises plural outlets for expelling the fluid from the nozzle.

Optionally, each of the outlets is for receiving the fluid from the passage.

Optionally, the nozzle comprises plural passages, wherein each of the passages connects the chamber to a respective one of the outlets and has a cross-sectional area that is less than the cross-sectional area of the chamber.

Optionally, the nozzle comprises a first part defining a cavity, and a second part that is attached or attachable to the first part and comprises a protrusion, wherein, when the first part is attached to the second part, the protrusion protrudes into the cavity so that: the chamber is defined by and between the first part and a distal end of the protrusion, and the passage is defined by and between the first part and a side of the protrusion.

Optionally, when the first part is attached to the second part, the passage encircles the protrusion.

Optionally, when the first part is attached to the second part, the distal end of the protrusion faces the inlet across the chamber.

Optionally, the first part defines the inlet and the second part defines the outlet or outlets.

Optionally, the cross-sectional area of the chamber normal to the flow path is larger than a cross-sectional area of the inlet normal to the flow path.

Optionally, the cross-sectional area of the inlet is less than 20% of the cross-sectional area of the chamber.

Optionally, the nozzle comprises a flange for attaching to an upstream part of the inert gas distribution system with the inlet in fluid communication with the upstream part.

A second aspect of the present invention provides a nozzle for an inert gas distribution system, the nozzle comprising: an inlet to receive fluid from a supply of fluid, a chamber to receive the fluid from the inlet and dimensioned relative to the inlet to permit the fluid to expand to form a mist, and at least one passage to receive the fluid from the chamber and dimensioned relative to the chamber to promote condensing of the mist, wherein the, or each, passage comprises an outlet to emit the fluid from the nozzle.

A third aspect of the present invention provides a method of emitting fluid into a fuel tank using a nozzle of an inert gas distribution system, the method comprising: receiving fluid at an inlet of the nozzle, allowing the fluid to expand in a chamber of the nozzle downstream from the inlet, promoting condensing of the fluid in at least one passage of the nozzle downstream from the chamber, and emitting the fluid into the fuel tank from an outlet of the, or each, passage.

A fourth aspect of the present invention provides an inert gas distribution system for an aircraft, the system comprising at least one nozzle according to the first aspect or the second aspect of the present invention.

A fifth aspect of the present invention provides an aircraft comprising the inert gas distribution system of the fourth aspect of the present invention.

Optionally, the aircraft comprises a reservoir for storing fuel, wherein the or each outlet of the nozzle is in fluid communication with the reservoir.

BRIEF DESCRIPTION OF THE DRAWINGS

Embodiments of the invention will now be described, by way of example only, with reference to the accompanying drawings, in which.

DETAILED DESCRIPTION

An inert gas distribution system of an aircraft may comprise at least one outlet nozzle that has a small hole or flow restrictor that moderates the flow of inert gas therethrough into a fuel tank of the aircraft. The fuel tank may, for example, be in a wing or a fuselage of the aircraft. The system may include plural such nozzles that distribute the inert gas within the fuel tank, and the flow restrictors regulate the amount of inert gas that is distributed in localised areas.

At times, one or more of the nozzles may be submerged in fuel. For example, this may occur when the aircraft is stationary and there is sufficient fuel in the fuel tank that the nozzle or nozzles are below an upper surface of the fuel. Additionally, or alternatively, the pitching, rolling and, potentially, yawing of an aircraft in flight may cause the fuel to move in the fuel tank and, at least temporarily, cover the nozzle or nozzles. Such submergence can result in fuel entering the inert gas distribution system from the fuel tank via the nozzle or nozzles. During subsequent supply of inert gas to the nozzle or nozzles for expulsion into the fuel tank, at least a portion of the fuel in the system may be expelled with the inert gas. It is desirable in such circumstances to minimise or avoid the expulsion of fuel into the fuel tank in the form of a vapour or mist, since, in principle at least, misted fuel has an increased flammability risk as compared to fuel in an unmisted state. Fuel in an unmisted state may take the form of fuel droplets or a liquid flow, for example. The output of fuel mist may be non-constant, since the ratio of fuel to inert gas can fluctuate randomly.

Figure 1:
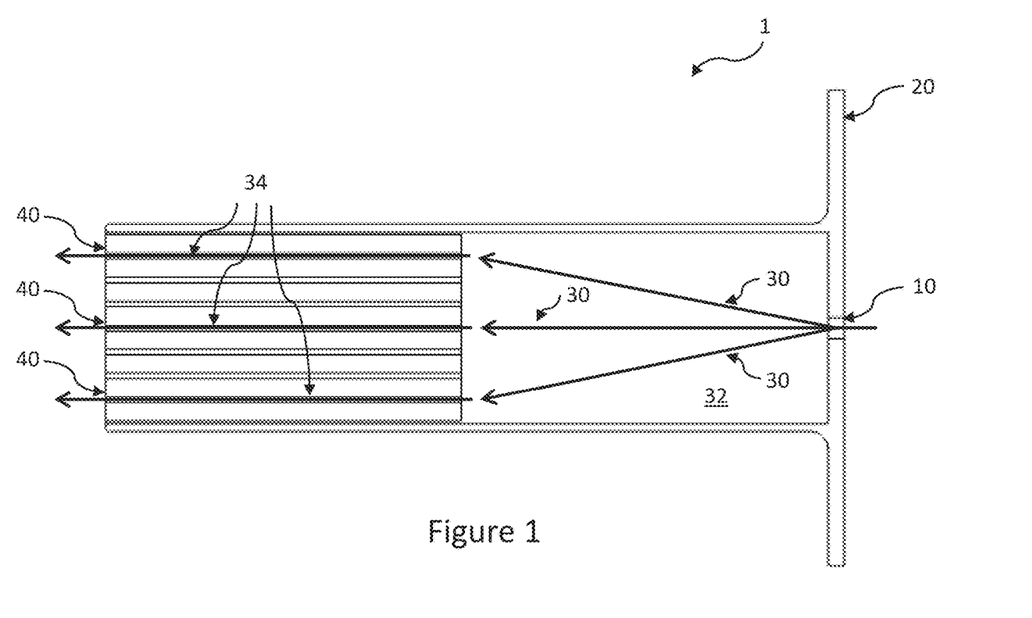
FIG. 1 shows a schematic cross-sectional side view of an example of an inert gas distribution system nozzle.
Figure 2:
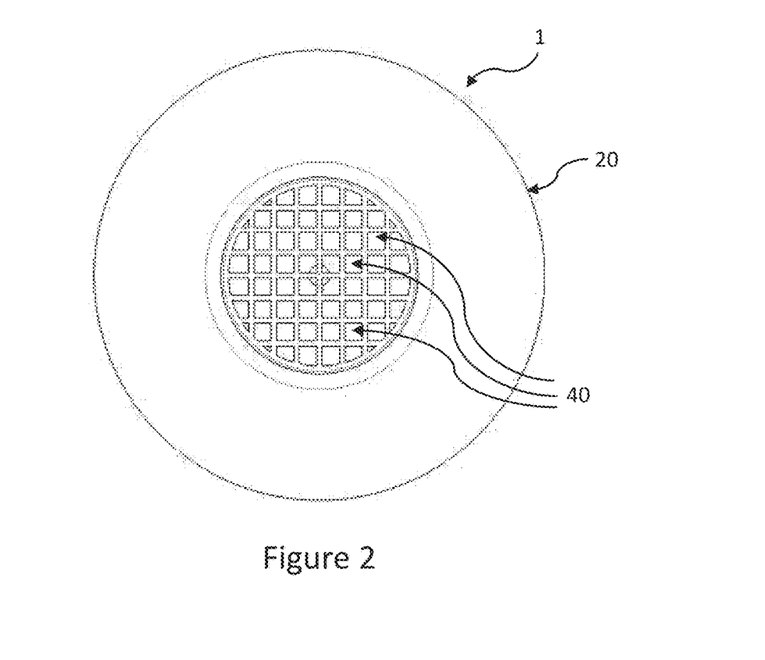
FIG. 2 shows a schematic end view of the nozzle of FIG. 1.

Referring to FIGS. 1 and 2, there are shown a schematic cross-sectional side view and a schematic end view of an example of an inert gas distribution system nozzle according to an embodiment of the invention. The nozzle 1 is designed to lessen the chance of fuel being expelled from the nozzle 1 into a fuel tank in the form of a vapour or mist, such as during clearance of the fuel from the inert gas distribution system by inert gas.

The nozzle 1 comprises an inlet 10 for receiving fluid. The fluid may be received from a supply of fluid. The supply of fluid may be part of the inert gas distribution system. Alternatively, the supply of fluid may be external to the inert gas distribution system but able to supply fluid to the inlet 10 of the nozzle 1 via the inert gas distribution system. The fluid may consist of inert gas. In some embodiments, inert gas may be generated onboard an aircraft during flight. The inert gas may, for example, be nitrogen, nitrogen-enriched-air, steam or carbon dioxide. A different inert gas may be used in other embodiments. The inlet 10 may be a flow restrictor that moderates the flow of fluid through the inlet 10 into the nozzle 1. The inlet 10 may be circular. The inlet 10 may, for example, have a cross-sectional area of between 5 mm$^2$ and 220 mm$^2$, such as between 7 mm$^2$ and 180 mm$^2$. The inlet 10 may primarily be dimensioned to suitably restrict the flow of inert gas during operation of the nozzle when no fuel ingress has occurred.

The fluid flow through the inlet 10 may be in the form of a jet. As noted above, in some circumstances fuel, such as liquid fuel, may enter the inert gas distribution system from the fuel tank in which the nozzle 1 is located in use via one or more nozzles, such as the nozzle 1. Accordingly, in such circumstances, the fluid received at the inlet 10 may comprise both fuel and inert gas. For example, a mixture of fuel and inert gas may be received at the inlet 10 from upstream in the inert gas distribution system, should the fuel ingress reach a position upstream in the inert gas distribution system. Alternatively, inert gas may be received at the inlet 10 from upstream in the inert gas distribution system, and fuel may be received at the inlet 10 from the fuel tank via downstream sections of the nozzle 1. In either circumstance, fuel and inert gas may both be present at the inlet 10.

The nozzle 1 of this embodiment has a flange 20 for attaching to an upstream part (see FIG. 3) such as another flange, of the inert gas distribution system with the inlet 10 in fluid communication with the upstream part. In other embodiments, the nozzle 1 may be attachable to part of the inert gas distribution system by way of other than associated flanges, and so the flange 20 may be omitted.

The nozzle 1 comprises a flow path 30 that extends from the inlet 10 to a downstream section of the nozzle 1 as will be described below. The flow path 30 comprises a chamber 32 and a passage 34. The chamber 32 is located between the inlet 10 and the passage 34 and is for receiving fluid from the inlet 10. The fluid may comprise both fuel and inert gas, as discussed above. The chamber 32 may, for example, have a circular cross-sectional shape normal to the flow path 30, as shown in FIGS. 1 and 2. Alternatively, in other embodiments, the cross-sectional shape of the chamber 32 may be other than circular, such as elliptical or polygonal.

The chamber 32 is configured or dimensioned relative to the inlet 10 to permit the fluid to disperse or expand to form a mist. This may form a cone of fuel and gas. In general, and all other criteria being equal, the smaller the cross-sectional area of the inlet 10, the wider or larger the cone. In FIG. 1, this expansion is depicted by way of diverging lines emanating from the inlet 10. To achieve this effect, the chamber 32 may have a cross-sectional area normal to the flow path 30 that is larger, or much larger, than a cross-sectional area of the inlet 10 normal to the flow path 30. For example, the cross-sectional area of the inlet 10 may be between 0.025% and 35% of the cross-sectional area of the chamber 32, such as between 0.04% and 30% of the cross-sectional area of the chamber 32, or between 0.07% and 20% of the cross-sectional area of the chamber 32. The cross-sectional area of the inlet 10 may be less than 20% of the cross-sectional area of the chamber 32, such as less than 10% of the cross-sectional area of the chamber 32. The chamber 32 may, for example, have a cross-sectional area of between 750 mm$^2$ and 1,200 mm$^2$, such as between 900 mm$^2$ and 1,050 mm$^2$.

The passage 34 of this embodiment is for receiving fluid from the chamber 32, such as in the form of the mist discussed above. The passage 34 may, for example, have a circular cross-sectional shape normal to the flow path 30. Alternatively, in other embodiments, the cross-sectional shape of the passage 34 may be other than circular, such as elliptical or polygonal, such as square, as shown in FIG. 2. In this embodiment, each of the passages is straight or linear, or substantially straight or linear. This can aid with manufacture of the nozzle 1, as described below. However, in other embodiments, the passage 34 may be non-linear, such as curved.

The passage 34 is configured or dimensioned relative to the chamber 32 to promote condensing of this mist. To achieve this effect, a cross-sectional area of the passage 34 normal to the flow path 30 may be less than a cross-sectional area of the chamber 32 normal to the flow path 30. The cross-sectional area of the passage 34 may be between 0.05% and 10% of the cross-sectional area of the chamber 32, such as between 0.07% and 5% of the cross-sectional area of the chamber 32, or between 1% and 2% of the cross-sectional area of the chamber 32. The cross-sectional area of the passage 34 may be less than 10% of the cross-sectional area of the chamber 32, such as less than 5% or 2% of the cross-sectional area of the chamber 32. The passage 34 may, for example, have a cross-sectional area of between 4 mm$^2$ and 20 mm$^2$, such as between 9 mm$^2$ and 15 mm$^2$.

This condensing preferably causes the fuel mist, or at least a portion or a majority thereof, to change to an unmisted state, such as fuel droplets or liquid flow. The passage 34, or more specifically its cross-sectional area and/or length, may also be configured or dimensioned to promote laminar flow of the fluid therethrough. This may further help de-misting of the fuel during its flow through the passage 34. For example, a length of the passage 34 may be at least 80% of a length of the chamber 32 in the direction of the flow path 30, such as at least 100% or 120% of a length of the chamber 32 in the direction of the flow path 30. The passage 34 preferably has a length in the direction of the flow path 30 of between 50 mm and 100 mm, such as between 60 mm and 80 mm.

The passage 34 of the nozzle 1 also comprises an outlet 40 to emit the fluid from the nozzle 1. More specifically, the outlet 40 is for receiving the unmisted, or less-misted, fluid from the flow path 30 and expelling the fluid from the nozzle 1. In use, the fluid would be emitted from the outlet 40 into the fuel tank.

Although not necessary in all embodiments, in this embodiment the nozzle 1 comprises plural outlets 40 for expelling the fluid from the nozzle 1. More specifically, the nozzle 1 comprises plural passages 34, and each of the passages 34 connects the chamber 32 to a respective one of the outlets 40. Each of the passages 34 has a cross-sectional area that is less than the cross-sectional area of the chamber 32. As in the illustrated embodiment, the passages may be substantially parallel to each other, but in other embodiments they could be non-parallel to each other. Preferably, each of the passages 34 is configured or dimensioned relative to the chamber 32 to promote condensing of this fuel mist received from the chamber 32.

The nozzle 1 of FIGS. 1 and 2 can therefore be considered to comprise plural flow paths extending from the inlet 10 (although only three are depicted in FIG. 1 for clarity). Each of the flow paths 30 comprises the chamber 32 (which is common to all the flow paths 30) and a respective one of the passages 40, wherein a cross-sectional area of each of the passages 40 normal to the respective flow path 30 is less than a cross-sectional area of the chamber 32 normal to the flow path 30.

Figure 3:
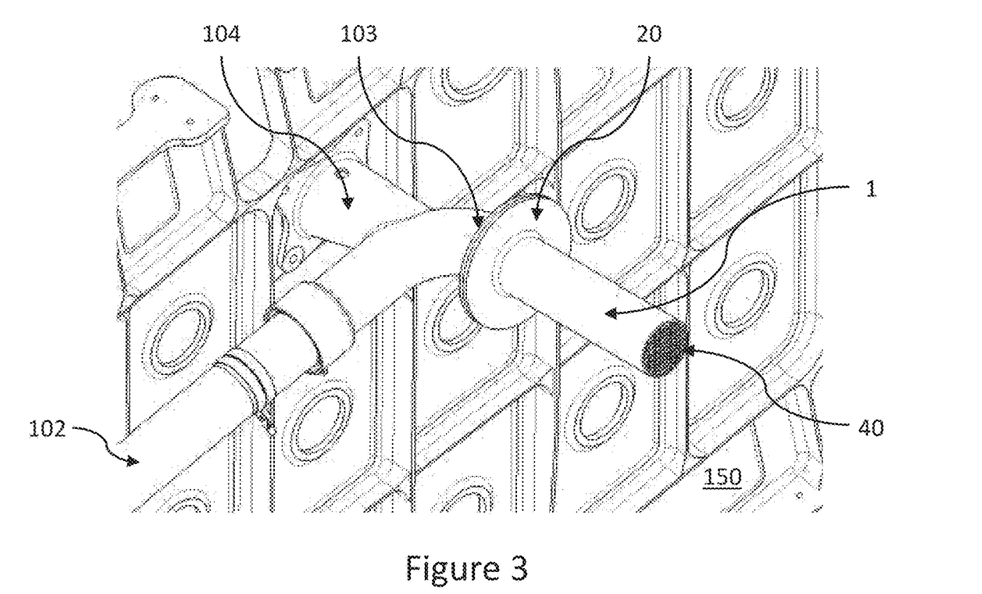
FIG. 3 shows a schematic perspective view of the nozzle of FIGS. 1 and 2 attached to an upstream part of an inert gas distribution system.

FIG. 3 shows a partial schematic perspective view of the nozzle 1 of FIGS. 1 and 2 attached to an upstream part 102 of an inert gas distribution system 100. The upstream part 102 is a pipe for supplying inert gas to the nozzle 1. The pipe 102 is held in position relative to a fuel tank or reservoir 150 by way of a support 104. The flange 20 of the nozzle 1 is connected, such as by one or more fasteners such as rivets (not shown) or be way of adhesive or welding, to a flange 103 at an end of the pipe 102 so as to be retained in position relative to the pipe 102 and relative to the fuel tank 150. The outlets 40 of the nozzle 1 are in fluid communication with the fuel tank 150.

A nozzle 1 similar to that of FIGS. 1 and 2 may be made in one of a number of ways. One method would be to machine a cylinder of material to an appropriate external dimension or diameter, and then to bore out the chamber 32 from a first axial end of the cylinder and drill the passages 34 from the opposite second axial end of the cylinder. Finally, the flange 20 could be attached at the first axial end of the cylinder. Drilling of the passages 34 probably would only be possible when the passages 34 are circular in cross-section. For other cross-sections, other fabrication techniques may have to be used. One such possibility would be to manufacture the nozzle 1 by additive manufacturing (also sometimes known as "3D printing"). The nozzle 1 may be made from, for example, a metal such as aluminium, a thermoplastic such as polyether ether ketone (PEEK), or a composite material. Any material used would have to be suitably resistant to damage arising from contact with fuel, of course.

Figure 4:
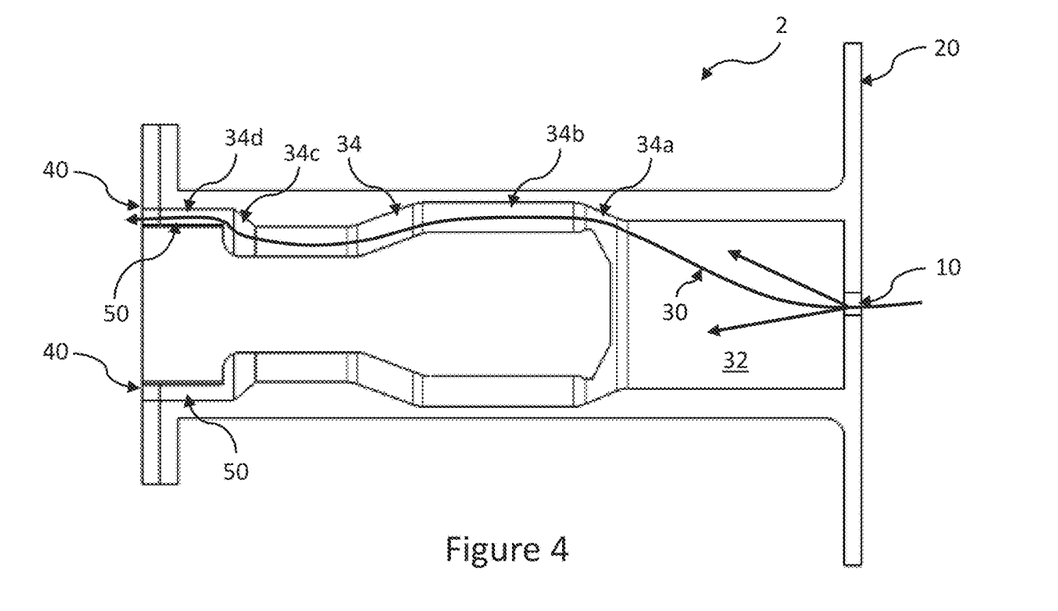
FIG. 4 shows a schematic cross-sectional side view of an example of another inert gas distribution system nozzle.
Figure 5:
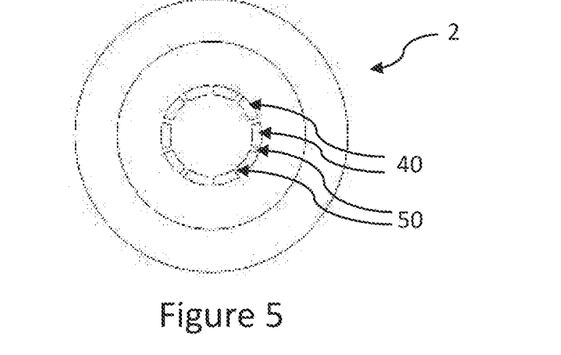
FIG. 5 shows a schematic end view of the nozzle of FIG. 4.

Referring to FIGS. 4 and 5, there are shown a schematic cross-sectional side view and a schematic end view of an example of another inert gas distribution system nozzle according to an embodiment of the invention.

The nozzle 2 comprises an inlet 10 for receiving fluid. The fluid may be received from a supply of fluid. The supply of fluid may be part of the inert gas distribution system. Alternatively, the supply of fluid may be external to the inert gas distribution system but able to supply fluid to the inlet 10 of the nozzle 2 via the inert gas distribution system. The fluid may consist of inert gas, which may, for example, be one of those discussed elsewhere herein. In some embodiments, inert gas may be generated onboard an aircraft during flight. The inlet 10 may be a flow restrictor that moderates the flow of fluid through the inlet 10 into the nozzle 2. The inlet 10 may be circular. The inlet 10 may, for example, have a cross-sectional area similar to that discussed above for the inlet 10 of the nozzle 1.

As noted above with reference to the nozzle 1 of FIGS. 1 and 2, in some circumstances fuel and inert gas may both be present at the inlet 10. The nozzle 2 is again designed to lessen the chance of fuel being expelled from the nozzle 2 into a fuel tank in the form of a vapour or mist, such as during clearance of the fuel from the inert gas distribution system by inert gas.

The nozzle 2 of this embodiment also has a flange 20 for attaching to an upstream part (see FIG. 7), such as another flange, of the inert gas distribution system with the inlet 10 in fluid communication with the upstream part. In other embodiments, the nozzle 2 may be attachable to part of the inert gas distribution system by way of other than associated flanges, and so the flange 20 may be omitted.

The nozzle 2 comprises a flow path 30 that extends from the inlet 10 to a downstream section of the nozzle 2 as will be described below. The flow path 30 comprises a chamber 32 and a passage 34. The chamber 32 is located between the inlet 10 and the passage 34 and is for receiving fluid from the inlet 10. The fluid may comprise both fuel and inert gas, as discussed above. The chamber 32 may, for example, have a circular cross-sectional shape normal to the flow path 30, as shown in FIGS. 4 and 5. Alternatively, in other embodiments, the cross-sectional shape of the chamber 32 may be other than circular, such as elliptical or polygonal.

The chamber 32 is again configured or dimensioned relative to the inlet 10 to permit the fluid to disperse or expand to form a mist. In FIG. 4, this expansion is depicted by way of diverging lines emanating from the inlet 10. To achieve this effect, the chamber 32 may have a cross-sectional area normal to the flow path 30 that is larger, or much larger, than a cross-sectional area of the inlet 10 normal to the flow path 30. For example, the cross-sectional area of the chamber 32, and relative to the cross-sectional area of the inlet, may be as discussed above in relation to the nozzle 1 of FIGS. 1 and 2.

The passage 34 of this embodiment is for receiving fluid from the chamber 32, such as in the form of the mist discussed above. In this embodiment, the passage 34 has an annular cross-sectional shape normal to the flow path 30 and is non-linear or not straight in the general direction of the flow path 30. Alternatively, in other embodiments, the passage 34 may be other than annular, such as arc-shaped, and/or may be linear in the general direction of the flow path 30.

The passage 34 is configured or dimensioned relative to the chamber 32 to promote condensing of the fuel mist. To achieve this effect, a cross-sectional area of the passage 34 normal to the flow path 30 is less than a cross-sectional area of the chamber 32 normal to the flow path 30. For example, the cross-sectional area of the passage 34, and relative to the cross-sectional area of the chamber 32, may be as discussed above in relation to the nozzle 1 of FIGS. 1 and 2.

This condensing preferably causes the fuel mist, or at least a portion or a majority thereof, to change to an unmisted state, such as fuel droplets or liquid flow. The passage 34, or more specifically its cross-sectional area and/or length, may also be configured or dimensioned to promote laminar flow of the fluid therethrough. This may further help de-misting of the fuel during its flow through the passage 34. For example, in this embodiment, a length of the passage 34 is about double a length of the chamber 32 in the direction of the flow path 30. In some embodiments, a ratio of the lengths of the passage 34 and the chamber 32 may be other than this, but preferably the passage 34 length is at least 80% of the chamber 32 length, such as at least 100%, 120%, 150% or 200% of a length of the chamber 32 in the direction of the flow path 30. The passage 34 preferably has a length in the direction of the flow path 30 of between 60 mm and 100 mm, such as between 70 mm and 90 mm. The chamber 32 preferably has a length in the direction of the flow path 30 of between 30 mm and 50 mm, such as between 35 mm and 45 mm.

The passage 34 of the nozzle 2 also comprises an outlet 40 to emit the fluid from the nozzle 2. More specifically, the outlet 40 is for receiving the unmisted, or less-misted, fluid from the flow path 30 and expelling the fluid from the nozzle 2. In use, the fluid would be emitted from the outlet 40 into the fuel tank.

Although not necessary in all embodiments, in this embodiment the nozzle 2 comprises plural outlets 40 for expelling the fluid from the nozzle 2. The outlets 40 are separated and spaced apart in a circumferential direction by a plurality of fins 50. Each of the outlets 40 is for receiving the fluid from the same annular passage 34. Therefore, the passage 34 connects the chamber 32 to each of the outlets 40. In this embodiment, the outlets 40 are substantially parallel to each other, but in other embodiments they could be non-parallel to each other. Each of the outlets 40 may be configured or dimensioned to further promote condensing and laminar flow of fuel mist received from the chamber 32.

The passage 34 of the nozzle 2 comprises a series of distinct regions with distance from the chamber 32. A first passage region 34a, immediately downstream of the chamber 32, is a more restricted flow space than the chamber 32. As such, the first passage region 34a tends to reduce turbulence in the fluid flow. A second passage region 34b immediately downstream of the first passage region 34a is relatively straight and acts as a flow straightener. By the end of the second passage region 34b, the fluid flow is less turbulent and more linear and condensed as compared to the fluid flow upstream. The fluid flow may also be under lower pressure and have a lower speed in the second passage region 34b. The fluid exits the second passage region 34b and enters a third passage region 34c, which comprises a restriction and a change of direction of the passage 34 from generally axial to generally radial. This may help to regulate or lower the pressure of the fluid even further. Thereafter, the fluid flow enters a fourth passage region 34d in which the fluid flow is split by the fins 50, which are themselves straight and thus act to further promote straightening of the fluid flow. Thereafter, the fluid exits the nozzle 2 via the outlets 40 between the fins 50.

Figure 6:
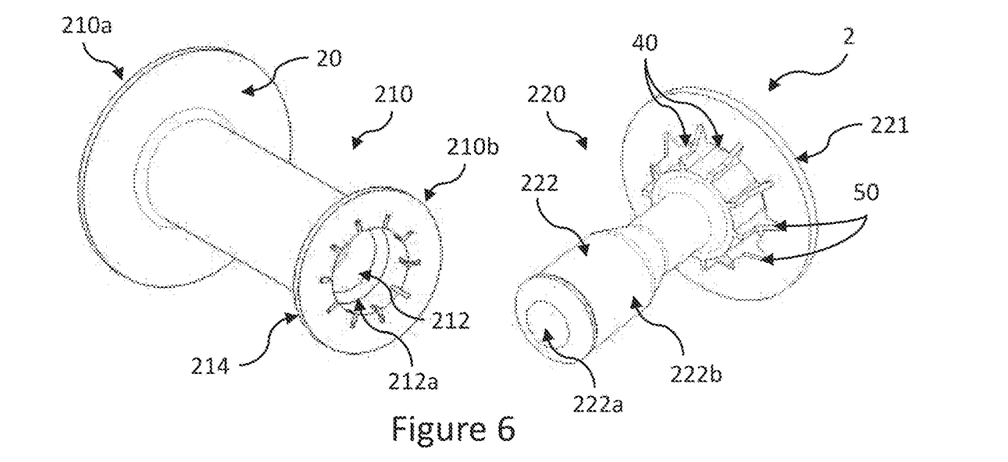
FIG. 6 shows a schematic perspective view of first and second parts of the nozzle of FIG. 4 in an unassembled state.

The nozzle 2 of FIGS. 4 and 5 may be made in one of a number of ways, but one method will be described with reference to FIG. 6. FIG. 6 shows a schematic perspective view of first and second parts 210, 220 of the nozzle 2 of FIG. 4 in an unassembled state. When attached to each other in an assembled state, the first and second parts 210, 220 are relatively positioned as shown in FIGS. 4 and 5.

The first part 210 defines a cavity 212 that extends fully through the first part 210 from a first axial end 210a to an opposite second axial end 210b. The first axial end 210a of the first part 210 comprises the flange 20 discussed above. The inlet 10 also discussed above extends through the first axial end 210a into the cavity 212. The second axial end 210b of the first part 210 comprises an annular end plate 214 that is substantially parallel to the flange 20 at the first axial end 210a. An interior wall surface 212a of the first part 210 is suitably shaped to cooperate with the second part 220 to define the chamber 32 and the passage 34.

The second part 220 comprises an end plate 221 and a protrusion 222 extending in an axial direction away from the end plate 221. The protrusion 222 is connected to the end plate 221 by way of the fins 50 discussed above. Moreover, the second part 220 defines the outlets 40 that are separated and spaced apart by the fins 50. The protrusion 222 of this embodiment has a circular cross-section, and so the protrusion 222 has a circumferential side 222b. The protrusion 222 terminates at and end 222a distal from the end plate 221. The protrusion 222, and more particularly the distal end 222a and side 222b thereof, is suitably shaped to cooperate with the first part 220 to define the chamber 32 and the passage 34.

When the first part 210 is attached to the second part 220, as shown in FIGS. 4 and 5, the protrusion 222 of the second part 220 protrudes into the cavity 212 of the first part 210. The end plates 214, 221 of the first and second parts 210, 220 abut and are retainable relative to each other by, for example, one or more fasteners such as rivets (not shown) or be way of adhesive or welding. When the first part 210 is attached to the second part 220, the protrusion 222 and the first part 210 cooperate so that the chamber 32 is defined by and between the first part 210 and the distal end 222a of the protrusion 222. Moreover, when the first part 210 is attached to the second part 220, the distal end 222a of the protrusion 222 faces the inlet 10 of the first part 210 across the chamber 32. The distal end 222a thus acts as an impacting plate to encourage fluid in the chamber 32 to flow towards the passage 34.

Furthermore, when the first part 210 is attached to the second part 220, the protrusion 222 and the first part 210 cooperate so that the annular passage 34 is defined by and between the first part 210 and the side 222b of the protrusion 222. Accordingly, when the first part 210 is attached to the second part 220, the passage 34 encircles the protrusion 222.

Each of the first and second parts 210, 220 may be made by suitably machining cylinders of material to appropriate external dimensions or diameters, and then boring out the cavity 212 of the first part 210 and suitably profiling the protrusion 222 of the second part 220. The end plates 214, 221 and the flange 20 could be separate parts attached to the appropriate ones of the first and second parts 210, 220. In other embodiments, each of the parts 210, 220, or even the entire nozzle 2, may be made by some other fabrication techniques, such as additive manufacturing. The nozzle 2 may be made from, for example, a metal such as aluminium, a thermoplastic such as PEEK, or a composite material.

Figure 7:
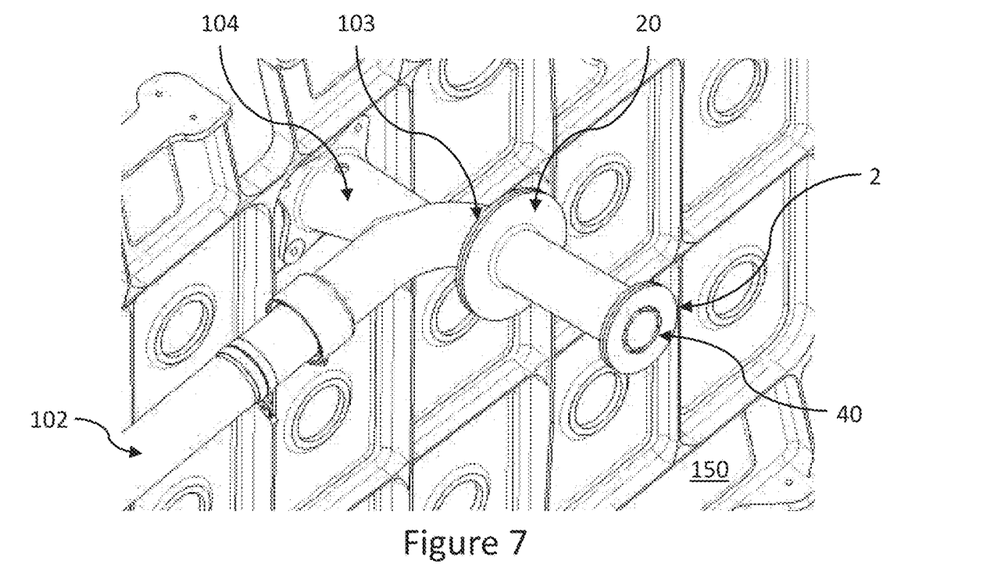
FIG. 7 shows the nozzle of FIGS. 4 and 6 attached to an upstream part of an inert gas distribution system.

FIG. 7 shows a partial schematic perspective view of the nozzle 2 of FIGS. 4 and 5 attached to an upstream part 102 of an inert gas distribution system 100. The upstream part 102 is a pipe for supplying inert gas to the nozzle 2. The pipe 102 is held in position relative to a fuel tank or reservoir 150 by way of a support 104. The flange 20 of the nozzle 2 is connected, such as by one or more fasteners such as rivets (not shown) or be way of adhesive or welding, to a flange 103 at an end of the pipe 102 so as to be retained in position relative to the pipe 102 and relative to the fuel tank 150. The outlets 40 of the nozzle 2 are in fluid communication with the fuel tank 150.

Example methods of emitting fluid into a fuel tank using a nozzle of an inert gas distribution system will now be described. In some embodiments, the method is performed using one or more of the nozzles 1, 2 discussed above and shown in the Figures, and so suitable reference numerals indicating the relevant elements of those nozzles 1, 2 are included in the following discussion. However, it will be appreciated that in other embodiments the method may be performed using a different nozzle to those specifically discussed herein.

Figure 8:
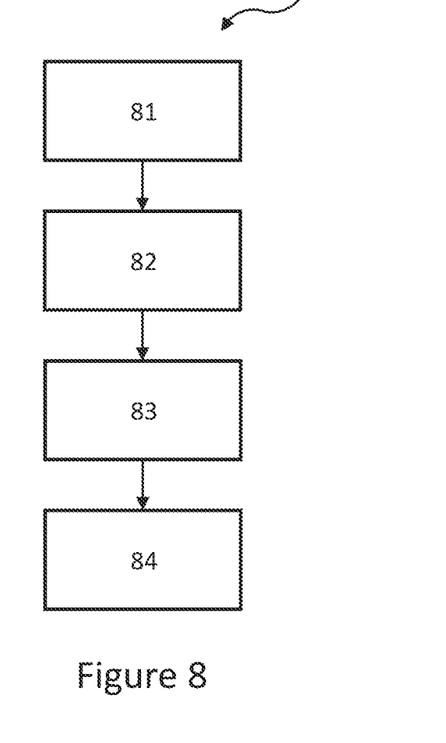
FIG. 8 shows a flow diagram showing an example of a method of emitting fluid into a fuel tank using a nozzle of an inert gas distribution system.

FIG. 8 shows a flow chart illustrating an example of a method of emitting fluid into a fuel tank using a nozzle of an inert gas distribution system. The method 80 comprises receiving 81 fluid at an inlet 10 of the nozzle 1, 2. As noted elsewhere herein, this may comprise receiving both fuel and inert gas at the inlet 10, optionally as a mixture. The method 80 also comprises allowing 82 the fluid to expand in a chamber 32 of the nozzle 1, 2 downstream from the inlet 10. As noted elsewhere herein, this may result in the creation of a fuel mist in the chamber 32. This could be due to the fuel being cleared from the system or specifically from the nozzle 1, 2 by the inert gas. The method 80 further comprises promoting 83 condensing of the fluid in at least one passage 34 of the nozzle 1, 2 downstream from the chamber 32. The method 80 may also comprise promoting laminar flow, or giving at least a portion of the fuel laminar flow in the at least one passage 34. Furthermore, the method 80 comprises emitting the fluid into the fuel tank from an outlet 40 of the, or each, passage 34 of the nozzle 1, 2.

At least one of the nozzles 1, 2 described herein may be supplied in isolation for use in an inert gas distribution system for an aircraft. The nozzle 1, 2 could be relatively easily retrofitted into an existing inert gas distribution system, such as one of the systems 100 shown in FIGS. 3 and 7, for example by simply bolting the nozzle 1, 2 onto an output of the system with the inlet 10 of the nozzle 1, 2 aligned to receive fluid from the output of the system. Alternatively, the nozzle or nozzles 1, 2 may be supplied as part(s) of such a system, such as one of the systems 100 shown in FIGS. 3 and 7. In some embodiments, an aircraft (such as that discussed below) may comprise such an inert gas distribution system and a reservoir for storing fuel, wherein the or each outlet of the nozzle 1, 2 is in fluid communication with the reservoir.

Figure 9:
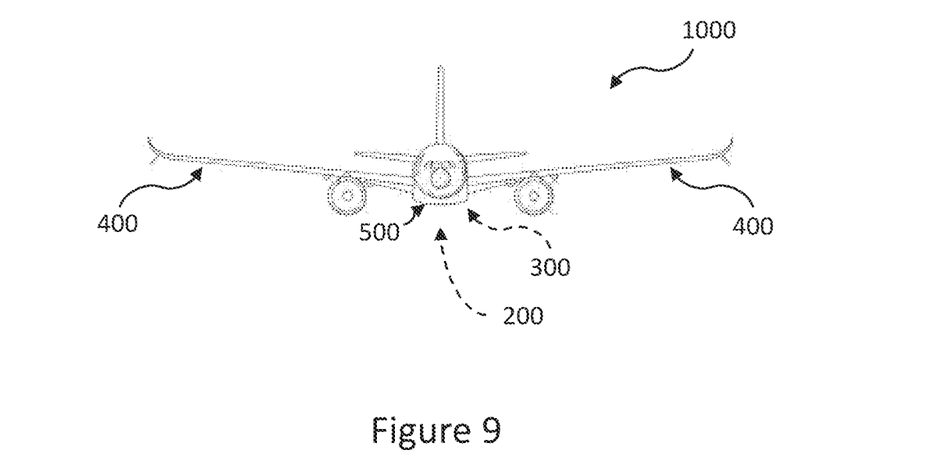
FIG. 9 shows a schematic front view of an example of an aircraft.

FIG. 9 shows a schematic front view of an example aircraft 1000 comprising an inert gas distribution system 200. The aircraft 1000 comprises a reservoir 300 for storing fuel. The reservoir 300 may be in one or both wings 400 of the aircraft 1000 and/or in a fuselage 500 of the aircraft 1000. The system 200 may be one of those discussed above. The system 200 comprises at least one nozzle (not shown in FIG. 9) embodying the invention, and the or each outlet of the nozzle is in fluid communication with the reservoir 300. The or each nozzle may be one of the nozzles 1, 2 discussed above and shown in the Figures, or may be a different nozzle to those specifically discussed herein.

The output of an inert gas distribution system including a nozzle embodying the invention was compared to the output of an inert gas distribution system lacking such a nozzle. Testing was performed with air and water being provided to the inlet 10 of the nozzle 1, 2 at a pressure of 20 psi, to simulate the supply of fuel and inert gas to the inlet 10. It was found that the system lacking the nozzle resulted in the expulsion of a jet of mist, whereas the system with the nozzle resulted in the expulsion of more condensed water droplets from the nozzle.

It will therefore be appreciated that some embodiments of the invention provide a nozzle that is designed to lessen the chance of, or avoid, fuel being expelled from the nozzle of an inert gas distribution system into a fuel tank in the form of a vapour or mist, such as during clearance of the fuel from the inert gas distribution system by inert gas. The nozzle may be considered to disrupt the misting of fuel. Some embodiments promote expulsion of fuel as droplets or a liquid flow, for example. As noted above, this is preferable, since it can help reduce the flammability risk of the fuel. Moreover, some embodiments of the present invention may enable the installation of a more optimised inerting system architecture, which could save both cost and weight on an aircraft.

It is to be noted that the term "or" as used herein is to be interpreted to mean "and/or", unless expressly stated otherwise.

The invention claimed is:

1. An inert gas distribution system nozzle, the nozzle comprising:
    an inlet configured to receive a fluid from a source of an inert gas,
    a flow path extending from the inlet, and
    an outlet configured to receive the fluid from the flow path and expel the fluid from the nozzle and into a fuel reservoir,
    wherein the flow path comprises a chamber and a passage, the chamber being located between the inlet and the passage and the chamber is adjacent the passage such that the flow path extends from the chamber immediately into the passage,
    wherein a cross-sectional area of the passage normal to the flow path is less than a cross-sectional area of the chamber normal to the flow path,
    wherein the cross-sectional area of the passage is less than ten percent of the cross-sectional area of the chamber at each point along the length of the passage, and
    wherein the length of the passage is in a range of 80% to 200% of the length of the chamber.

2. The nozzle according to claim 1, wherein the cross-sectional area of the chamber is configured to permit the fluid to form a mist, and the cross-sectional area of the passage is configured to promote condensing of the mist.

3. The nozzle according to claim 1, wherein the outlet includes plural outlets for expelling the fluid from the nozzle.

4. The nozzle according to claim 3, wherein the passage is a plurality of passages, and each of the outlets is configured to receive the fluid from a respective one of the passages.

5. The nozzle according to claim 1, further comprising a first part defining a cavity, and a second part attached or attachable to the first part and comprises a protrusion,
wherein, when the first part is attached to the second part, the protrusion protrudes into the cavity so that the chamber is defined by and between the first part and a distal end of the protrusion, and
the passage is defined by and between the first part and a side of the protrusion.

6. The nozzle according to claim 5, wherein when the first part is attached to the second part, and the passage encircles the protrusion.

7. The nozzle according to claim 5 wherein, when the first part is attached to the second part, the distal end of the protrusion faces the inlet across the chamber.

8. The nozzle according to claim 5, wherein the first part defines the inlet and the second part defines the outlet.

9. The nozzle according to claim 1, wherein the cross-sectional area of the chamber normal to the flow path is larger than a cross-sectional area of the inlet normal to the flow path.

10. The nozzle according to claim 9, wherein the cross-sectional area of the inlet is less than 20% of the cross-sectional area of the chamber.

11. The nozzle according to claim 1, further comprising a flange configured to attach to an upstream part of the inert gas distribution system with the inlet in fluid communication with the upstream part.

12. An inert gas distribution system nozzle comprising:
an inlet configured to receive fluid from a supply of an inert gas;
a flow passage extending from the inlet to an outlet of the nozzle, wherein the outlet is in a fuel reservoir;
a chamber within the flow passage and configured to receive the fluid from the inlet and dimensioned relative to the inlet to permit the fluid to expand to form a mist, wherein the chamber defines a first portion of the flow passage having a first cross-sectional area normal to a flow direction through the first portion and a first length along the flow direction, and
at least one passage in the flow passage and configured to receive the fluid from the chamber and dimensioned relative to the chamber to promote condensing of the mist, wherein the, or each, of the at least one passage defines a second cross-sectional area of the flow passage normal to the flow direction and has a second length along the flow direction,
wherein the, or each, of the at least one passage comprises the outlet to emit the fluid from the nozzle,
wherein the second cross-sectional area of the, or each, of the at least one passage and at each point along the length of the at least one passage is no more than 10% of the first cross-sectional area of the chamber,
wherein the second length is in a range of 80% to 200% of the first length, and
wherein the chamber is adjacent the at least one passage such that the flow path extends from the chamber immediately into the at least one passage.

13. An inert gas distribution system for an aircraft, the system comprising at least one nozzle according to claim 1.

14. An aircraft comprising the inert gas distribution system of claim 13.

15. A non-combustible gas distribution system nozzle comprising:
an inlet configured to receive a fluid, wherein the inlet is configured to be connected to a source of a non-combustible gas and the fluid includes the non-combustible gas;
a flow path extending from the inlet to an outlet of the nozzle,
a chamber in the flow path and immediately downstream in the flow path of the inlet, wherein a chamber portion of the flow path is within the chamber and has a first cross-sectional area normal to the flow path through the chamber portion and a first length parallel to the flow path through the chamber portion; and
a passage in the flow path and between the chamber and the outlet, wherein a passage portion of the flow path is within the passage, has a second cross-sectional area normal to the flow path through the passage portion and which, at each point along the length of the passage portion, is no more than ten percent of the first cross-sectional area, and the passage portion has a second length parallel to the flow path through the passage portion and in a range of 80% to 200% of the first length,
wherein the outlet of the nozzle is open to an interior of a fuel tank in an aircraft, and
wherein the chamber is adjacent the passage such that the flow path extends from the chamber immediately into the passage.

16. The non-combustible gas distribution system nozzle of claim 15, wherein the inlet includes an inlet opening configured to allow the fluid to flow from the source of the non-combustible gas through the inlet and into the chamber, and the inlet opening has a third cross-sectional area normal to the flow path at the inlet,
wherein the third cross-sectional area is in a range of 0.025% to 35% of the first cross-sectional area.

17. The inert gas distribution system nozzle of claim 1, wherein the passage is a plurality of passages, the cross-sectional area of the passage is a cross-sectional area of each of the plurality of passages, and the length of the passage is a length of each of the plurality of passages.

18. The non-combustible gas distribution system nozzle of claim 15, wherein the passage is a plurality of passages, the cross-sectional area of the passage is a cross-sectional area of each of the plurality of passages, and the length of the passage is a length of each of the plurality of passages.

* * * * *